(12) United States Patent
Sato (10) Patent No.: US 11,014,405 B2
(45) Date of Patent: May 25, 2021

(54) PNEUMATIC TIRE (71) Applicant: SUMITOMO RUBBER INDUSTRIES, LTD., Kobe (JP)

(72) Inventor: Daisuke Sato, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 383 days.

(21) Appl. No.: 15/899,809

(22) Filed: Feb. 20, 2018

(65) Prior Publication Data
US 2018/0264884 A1 Sep. 20, 2018

(30) Foreign Application Priority Data

Mar. 16, 2017 (JP) .............................. JP2017-051351

(51) Int. Cl.
*B60C 1/00* (2006.01)
*C08L 7/00* (2006.01)
*C08L 9/00* (2006.01)
*B60C 9/12* (2006.01)
*C08J 3/215* (2006.01)
*B60C 5/14* (2006.01)
(Continued)

(52) U.S. Cl.
CPC .............. *B60C 1/0025* (2013.01); *B60C 1/00* (2013.01); *B60C 1/0016* (2013.01); *B60C 5/14* (2013.01); *B60C 9/12* (2013.01); *B60C 11/005* (2013.01); *B60C 13/00* (2013.01); *C08B 15/02* (2013.01); *C08J 3/215* (2013.01); *C08J 3/22* (2013.01); *C08K 7/04* (2013.01); *C08L 7/00* (2013.01); *C08L 9/00* (2013.01); *B60C 2011/0025* (2013.01); *B60C 2011/145* (2013.01); *B60C 2013/006* (2013.01); *B60C 2013/007* (2013.01); *C08J 2307/02* (2013.01); *C08J 2323/22* (2013.01); *C08J 2401/04* (2013.01); *C08J 2407/02* (2013.01); *C08J 2423/22* (2013.01); *C08K 2201/004* (2013.01)

(58) Field of Classification Search
CPC .................................................... B60C 1/0025
See application file for complete search history.

(56) References Cited

U.S. PATENT DOCUMENTS 2,187,146 A 1/1940 Calcott et al.
4,798,854 A 1/1989 Visca et al.
(Continued)

FOREIGN PATENT DOCUMENTS

JP 62-11731 A 1/1987
JP 62-104871 A 5/1987
(Continued)

OTHER PUBLICATIONS

English translation of the International Search Report, dated Feb. 27, 2018, for International Application No. PCT/JP2018/001640.

*Primary Examiner* — Liam J Heincer
(74) *Attorney, Agent, or Firm* — Birch, Stewart, Kolasch & Birch, LLP (57) ABSTRACT The present invention provides a pneumatic tire having excellent fuel efficiency, handling stability, and ride quality while maintaining a good balance between them. Provided is a pneumatic tire including a tire component formed from a rubber composition, the rubber composition having cured rubber properties satisfying predetermined values.

13 Claims, 1 Drawing Sheet (51) Int. Cl.
  *B60C 11/00* (2006.01)
  *C08K 7/04* (2006.01)
  *B60C 13/00* (2006.01)
  *C08B 15/02* (2006.01)
  *C08J 3/22* (2006.01)
  *B60C 11/14* (2006.01)

(56) References Cited

U.S. PATENT DOCUMENTS

| | | | |
|---|---|---|---|
| 5,300,555 | A | 4/1994 | Weih et al. |
| 5,373,229 | A | 12/1994 | Penniman |
| 10,414,882 | B2 | 9/2019 | Miyazaki |
| 10,428,188 | B2* | 10/2019 | Miyazaki ............ C08J 3/22 |
| 10,435,522 | B2 | 10/2019 | Miyazaki |
| 2005/0032960 | A1* | 2/2005 | Kishimoto ........ B60C 1/0016 524/432 |
| 2006/0091068 | A1 | 5/2006 | Nieland |
| 2009/0020203 | A1* | 1/2009 | Kikuchi ............ B60C 17/00 152/458 |
| 2011/0269872 | A1 | 11/2011 | Nam et al. |
| 2012/0183770 | A1* | 7/2012 | Bosnyak ............ B82Y 30/00 428/367 |
| 2013/0184373 | A1* | 7/2013 | Miyazaki ............ C08K 7/02 523/156 |
| 2013/0190426 | A1* | 7/2013 | Fujikura ............ B60C 1/0016 524/9 |
| 2013/0303657 | A1* | 11/2013 | Miyazaki ............ C08K 7/02 523/156 |
| 2013/0319589 | A1* | 12/2013 | Sato ............ C08K 3/04 152/209.5 |
| 2014/0066548 | A1 | 3/2014 | Miyazaki |
| 2014/0213700 | A1 | 7/2014 | Miyazaki et al. |
| 2014/0326386 | A1* | 11/2014 | Sato ............ B60C 9/0238 152/525 |
| 2016/0009877 | A1* | 1/2016 | Takaoka ............ B60C 1/00 524/575.5 |
| 2016/0032086 | A1* | 2/2016 | Takaoka ............ C08L 21/00 524/35 |
| 2016/0177512 | A1* | 6/2016 | Kawahara ............ F28F 21/00 435/289.1 |
| 2016/0272792 | A1* | 9/2016 | Miyazaki ............ C08L 1/02 |
| 2016/0280895 | A1* | 9/2016 | Bedard ............ C08J 3/226 |
| 2018/0016402 | A1* | 1/2018 | Miyazaki ............ B60C 1/00 |
| 2018/0079874 | A1 | 3/2018 | Lallet et al. |
| 2018/0264884 | A1 | 9/2018 | Sato |
| 2019/0040236 | A1* | 2/2019 | Sato ............ C08K 3/04 |

FOREIGN PATENT DOCUMENTS

| | | |
|---|---|---|
| JP | 2798585 B2 | 9/1998 |
| JP | 2000-273311 A | 10/2000 |
| JP | 2001-200165 A | 7/2001 |
| JP | 2004-99625 A | 4/2004 |
| JP | 2006-169321 A | 6/2006 |
| JP | 2006-306955 A | 11/2006 |
| JP | 2006-348216 A | 12/2006 |
| JP | 2010-144001 A | 7/2010 |
| JP | 2010-209175 A | 9/2010 |
| JP | 2011-140546 A | 7/2011 |
| JP | 2014-47328 A | 3/2014 |
| JP | 2014-118462 A | 6/2014 |
| JP | 2014-141637 A | 8/2014 |
| JP | 2014-144997 A | 8/2014 |
| JP | 2015-93882 A | 5/2015 |
| JP | 5770757 B2 | 8/2015 |
| JP | 2016-147996 A | 8/2016 |
| WO | 2014/142319 A1 | 9/2014 |
| WO | WO 2016/136453 A1 | 9/2016 |
| WO | WO 2016/163253 A1 | 10/2016 |
| WO | WO 2016/166483 A1 | 10/2016 |

\* cited by examiner

PNEUMATIC TIRE

TECHNICAL FIELD

The present invention relates to a pneumatic tire.

BACKGROUND ART

Enhancement of fuel efficiency for environmental protection is a common goal of automobiles these days. Various inventions and improvements have been made for this goal. With regard to automobile tires, rubber material approaches have been proposed, such as incorporation of materials with low energy loss, such as silica, into rubber compositions for tires, and structural approaches have been proposed, such as reduction of tire weight for lower energy loss.

However, lighter tires usually tend to have lower rigidity, resulting in reduced handling stability. In order to overcome this drawback, studies have been made to optimize the elastic modulus of the rubber, and it has been proposed to efficiently improve the elastic modulus by incorporating a short fibrous reinforcing agent (filler) into a rubber material.

For example, aramid, carbon short fiber, or similar materials have high reinforcing properties and can be used in small amounts to greatly improve the elastic modulus. However, these materials, when used as tire rubber materials, can form fracture nuclei due to both their large fiber diameter and large fiber length, thereby significantly reducing rubber strength. Moreover, the short fiber materials tend to show anisotropy to have different properties in oriented and non-oriented directions during tire production. If they show at least a certain degree of difference in properties, this may disadvantageously have an adverse effect, depending on the service conditions of the tires. Therefore, there is room for improvement.

In such a context, for example, Patent Literature 1 describes that a pneumatic tire achieving a balanced improvement of handling stability, ride quality, and elongation at break while having good fuel economy can be obtained by forming a tire component such as a sidewall from a rubber composition prepared from a masterbatch containing a modified natural rubber with a phosphorus content of 200 ppm or less and a microfibrillated plant fiber; and Patent Literature 2 describes that a light radial tire having improved handling stability while maintaining good ride quality and good rolling resistance can be obtained by inclusion of a sidewall with a thickness of 6 mm or less formed from a rubber composition in which most short fibers are oriented at an angle of ±20° to the circumferential direction of the tire, and the amount of carbon black is reduced.

CITATION LIST

Patent Literature

Patent Literature 1: Japanese Patent No. 5770757
Patent Literature 2: Japanese Patent No. 2798585

SUMMARY OF INVENTION

Technical Problem

As described above, various techniques for improving tire properties by incorporating short fiber materials into rubber compositions for tires have been proposed. However, for example, the technique of Patent Literature 1 involves the use of a relatively expensive modified natural rubber. Moreover, when such a rubber is used in a side component, e.g. a sidewall, of recent lighter tires, the tires cannot sufficiently satisfy the ride quality and vibration requirements demanded by the market, due to the high elastic modulus of the rubber, and thus leave room for improvement. Additionally, not much research was done on fuel efficiency and there is room for improvement also in fuel efficiency.

The technique of Patent Literature 2 is disadvantageous because of the large modulus ratio leading to a large difference between handling stabilities during straight running and during cornering. Additionally, the short fiber used in the rubber composition is still so long that it can initiate fracture upon bending, and thus such a rubber composition is disadvantageous.

Therefore, still further improvements are desired to improve the properties of light tires by incorporating short fiber materials into rubber compositions for tires.

The present invention aims to solve the above problems and provide a pneumatic tire having excellent fuel efficiency, handling stability, and ride quality while maintaining a good balance between them.

Solution to Problem

The present invention relates to a pneumatic tire, including a tire component formed from a rubber composition,
the rubber composition having cured rubber properties satisfying all relationships (1) to (3):

$$\tan \delta \leq 0.11 \tag{1},$$

$$1.10 \leq (E^*a/E^*b) \leq 1.53 \tag{2, and}$$

$$0.072 \leq (E^*a/HS) \leq 0.140 \tag{3}.$$

The tan $\delta$ in relationship (1) is a tan $\delta$ determined by viscoelastic measurement at an initial strain of 10%, a dynamic strain of 1%, and a temperature of 50° C.

The $E^*a$ in relationships (2) and (3) is a complex modulus $E^*a$ in a circumferential direction of the tire determined by viscoelastic measurement at an initial strain of 10%, a dynamic strain of 1%, and a temperature of 50° C.

The $E^*b$ in relationship (2) is a complex modulus $E^*b$ in a direction orthogonal to the circumferential direction of the tire determined by viscoelastic measurement at an initial strain of 10%, a dynamic strain of 1%, and a temperature of 50° C.

The HS in relationship (3) is a hardness (HS) at 50° C. determined in accordance with JIS K6253-1.

Preferably, the rubber composition contains a rubber component and a short fibrous filler, the short fibrous filler has a fiber width of 3 to 200 nm, a fiber length of 0.2 to 10 µm, and a ratio of the fiber length to the fiber width (fiber length/fiber width) of 5 to 1,000, and the short fibrous filler is present in an amount of 1.5 to 30 parts by mass per 100 parts by mass of the rubber component.

Preferably, the rubber composition contains a masterbatch, and the masterbatch is prepared by mixing a rubber latex having a zeta potential of −100 to −20 mV with a short fibrous filler dispersion having a zeta potential of −90 to −10 mV to prepare a latex compound and adjusting the latex compound to have a zeta potential of −30 to 0 mV.

The tire component is preferably at least one selected from the group consisting of a sidewall, a base tread, and an innerliner.

Preferably, the tire component is a sidewall, the sidewall includes a stack of two or more layers including an outer sidewall layer that forms an outer surface of the tire and an inner sidewall layer disposed axially inwardly of the outer sidewall layer, and the inner sidewall layer is formed from the rubber composition.

Preferably, the pneumatic tire includes the sidewall and a carcass coated with a topping rubber disposed axially inwardly of the inner sidewall layer, and a distance from an outer surface of the outer sidewall layer to an outer surface of the topping rubber at a position where the tire with a specified internal pressure has the maximum width is less than 3.5 mm.

Advantageous Effects of Invention

The pneumatic tire of the present invention includes a tire component formed from a rubber composition that has cured rubber properties satisfying all relationships (1) to (3). Such a pneumatic tire has excellent fuel efficiency, handling stability, and ride quality while maintaining a good balance between them.

DESCRIPTION OF EMBODIMENTS

The pneumatic tire of the present invention includes a tire component formed from a rubber composition, and the rubber composition has cured rubber properties satisfying all relationships (1) to (3):

$$\tan \delta \le 0.11 \tag{1},$$

$$1.10 \le (E^*a/E^*b) \le 1.53 \tag{2), and}$$

$$0.072 \le (E^*a/HS) \le 0.140 \tag{3}.$$

The tan δ in relationship (1) is the tan δ determined by viscoelastic measurement at an initial strain of 10%, a dynamic strain of 1%, and a temperature of 50° C.

The E*a in relationships (2) and (3) is the complex modulus E*a in the circumferential direction of the tire determined by viscoelastic measurement at an initial strain of 10%, a dynamic strain of 1%, and a temperature of 50° C.

The E*b in relationship (2) is the complex modulus E*b in a direction orthogonal to the circumferential direction of the tire determined by viscoelastic measurement at an initial strain of 10%, a dynamic strain of 1%, and a temperature of 50° C.

The HS in relationship (3) is the hardness (HS) at 50° C. determined in accordance with JIS K6253-1.

Herein, the term "cured rubber properties" means "properties of the rubber vulcanizate forming the tire component".

Thus, the rubber composition which has after vulcanization predetermined tan δ, E*a, E*b, and HS can be used in a tire component to provide a pneumatic tire having excellent fuel efficiency, handling stability, and ride quality while maintaining a good balance between them.

The rubber composition in the present invention has after vulcanization a tan δ of 0.11 or less as determined by viscoelastic measurement at an initial strain of 10%, a dynamic strain of 1%, and a temperature of 50° C.; namely, it satisfies the following relationship (1):

$$\tan \delta \le 0.11 \tag{1}.$$

In order to satisfy the fuel efficiency currently demanded by the market, it is necessary to control the energy loss to a predetermined value or less. Since the rolling resistance of a number of recently released fuel-efficient tires is measured at a tire temperature of about 50° C., tires that have a loss tangent (tan δ) range satisfying relationship (1) when determined at 50° C. by dynamic viscoelastic measurement are considered as having sufficient fuel efficiency and excellent fuel efficiency. For example, the tan δ is preferably 0.10 or less, more preferably 0.090 or less, still more preferably 0.080 or less. A lower tan δ is preferred and there is no critical lower limit.

The rubber composition also satisfies, after vulcanization, the following relationship (2):

$$1.10 \le (E^*a/E^*b) \le 1.53 \tag{2}.$$

In relationship (2), the E*a is the complex modulus (E*a [MPa]) in the circumferential direction of the tire determined by viscoelastic measurement at an initial strain of 10%, a dynamic strain of 1%, and a temperature of 50° C., and the E*b is the complex modulus (E*b [MPa]) in a direction orthogonal to the circumferential direction of the tire determined by viscoelastic measurement at an initial strain of 10%, a dynamic strain of 1%, and a temperature of 50° C.

Herein, the circumferential direction of the tire refers to the direction in which the tire rotates and corresponds to the extrusion direction of the vulcanized rubber composition. The direction orthogonal to the circumferential direction of the tire then refers to the direction orthogonal to the extrusion direction.

Thus, the complex modulus E*a in the tire circumferential direction indicates the rubber rigidity in the direction of the force applied during running of the tire. The complex modulus E*b in a direction orthogonal to the tire circumferential direction indicates the rubber rigidity when the tire is compressed or distorted.

Rubber compositions prepared using usual materials and methods tend to have after vulcanization a value of relationship (2) of less than 1.10. It is also known that tires can cause road noise during running on relatively rough roads such as asphalt, and can vibrate upon running over large projections on roads. Even with a highly fuel-efficient rubber composition having a tan δ satisfying relationship (1), it is difficult to reduce such vibration only by controlling the energy loss of the rubber, and it is necessary to control the elastic modulus in the tire compression direction to a predetermined value or less. When the E*a and E*b of the rubber composition satisfy relationship (2), it is possible to provide softness in the tire compression direction while maintaining running performance comparable to conventional tires, thereby simultaneously achieving handling stability and ride quality/vibration.

The value of relationship (2) is preferably 1.15 or more, more preferably 1.20 or more, still more preferably 1.25 or more, particularly preferably 1.30 or more, but is preferably 1.50 or less, more preferably 1.40 or less. The rubber composition satisfying relationship (2) can be used in tires to simultaneously achieve handling stability and ride quality. Particularly when the value of relationship (2) is 1.53 or less, the rigidity at the beginning of cornering, i.e. when the tire is distorted, is not excessively higher than the rigidity in the running direction, which eliminates the need for the driver to turn the steering wheel a lot, thereby providing excellent stability to the tire.

The rubber composition furthermore satisfies, after vulcanization, the following relationship (3):

$$0.072 \le (E^*a/HS) \le 0.140 \tag{3}.$$

In relationship (3), the E*a is the complex modulus (E*a [MPa]) in the circumferential direction of the tire determined by viscoelastic measurement at an initial strain of 10%, a dynamic strain of 1%, and a temperature of 50° C., and the HS is the hardness HS (type A) at 50° C. determined in accordance with JIS K6253-1.

The strain range used to measure the complex modulus is different from that for the hardness. Thus, relationship (3) indicates a ratio between the elastic modulus of the rubber at low strain and the elastic modulus at high strain. A higher ratio means that the rubber is harder at low strain, while a lower ratio means that the rubber is softer at high strain.

When the E*a and HS satisfy relationship (3), it is possible to provide hardness at high strain, such as for handling stability, and also to provide softness at low strain upon deformation caused by small road surface irregularities, such as for noise, thereby achieving a balanced improvement of handling stability and ride quality/noise.

The value of relationship (3) is preferably 0.080 or more, more preferably 0.090 or more, still more preferably 0.095 or more, particularly preferably 0.100 or more, but is preferably 0.130 or less, more preferably 0.125 or less, still more preferably 0.120 or less. The rubber composition satisfying relationship (3) can be used in tires to simultaneously achieve handling stability and ride quality.

The tan δ, complex modulus E*a in the tire circumferential direction, and complex modulus E*b in a direction orthogonal to the tire circumferential direction each determined by viscoelastic measurement at an initial strain of 10%, a dynamic strain of 1%, and a temperature of 50° C., and the hardness (HS) at 50° C. determined in accordance with JIS K6253-1 which satisfy all relationships (1) to (3) can be imparted to a vulcanized rubber composition by incorporating the predetermined filler described later into a rubber component. The incorporation of the predetermined filler is important.

It is generally known that the tan δ can be controlled by changing the type, form, or amount of filler or the amount of plasticizer; the E*a and E*b can be controlled by changing the type or form of filler; and the HS can be controlled by changing the amount of filler, the amount of plasticizer, or the amount of crosslinking agent.

The tan δ, complex modulus E*a in the tire circumferential direction, and complex modulus E*b in a direction orthogonal to the tire circumferential direction each determined by viscoelastic measurement at an initial strain of 10%, a dynamic strain of 1%, and a temperature of 50° C., and the hardness (HS) at 50° C. determined in accordance with JIS K6253-1 of the vulcanized rubber composition can be measured as described later in EXAMPLES.

The rubber composition in the present invention preferably contains a rubber component and a short fibrous filler having a fiber width of 3 to 200 nm, a fiber length of 0.2 to 10 μm, and a ratio of the fiber length to the fiber width (fiber length/fiber width) of 5 to 1,000 as a filler. The incorporation of the short fibrous filler into the rubber component provides for excellent fuel efficiency, handling stability, and ride quality while maintaining a good balance between them.

<Rubber Component>

Examples of the rubber component used in the present invention include rubbers commonly used in the rubber industry. Preferred examples include diene rubbers such as natural rubber (NR), modified natural rubbers, e.g. epoxidized natural rubber (ENR), hydrogenated natural rubber, and deproteinized natural rubber, polyisoprene rubber (IR), polybutadiene rubber (BR), styrene-butadiene rubber (SBR), styrene-isoprene rubber, styrene-isoprene-butadiene rubber (SIBR), isoprene-butadiene rubber, acrylonitrile butadiene rubber (NBR), acrylonitrile-styrene-butadiene rubber, chloroprene rubber (CR), and chlorosulfonated polyethylene. The rubber component may include rubbers other than the diene rubbers. Examples of other rubbers include butyl-based rubbers such as halogenated butyl rubber (X-IIR) and butyl rubber (IIR), ethylene-propylene copolymer rubber, acrylic rubber, epichlorohydrin rubber, polysulfide rubber, silicone rubber, fluororubber, and urethane rubber.

These rubbers may be used alone or as a blend of two or more, and may be subjected to condensation or modification. When a blend is used, the blending ratio may be selected appropriately according to the particular application.

Among these rubbers, NR, BR, and SBR are preferred because they provide for a good balance of rubber strength and fuel efficiency. It is also preferred to use a combination of NR and BR, a combination of NR and SBR, a combination of BR and SBR, or a combination of NR, BR, and SBR as the rubber component because the effects of the present invention can be more suitably achieved. Embodiments using a combination of NR and BR, among others, are particularly preferred.

Non-limiting examples of the natural rubber (NR) include those commonly used in the rubber industry, such as SIR20, RSS#3, and TSR20.

Non-limiting examples of the polybutadiene rubber (BR) include those commonly used in the tire industry, for example, products available from Zeon Corporation, Ube Industries, Ltd., and Lanxess. These types of BR may be used alone, or two or more of these may be used in combination.

The BR preferably has a cis content of 70% by mass or more, more preferably 90% by mass or more, still more preferably 97% by mass or more.

The cis content (cis 1,4-linkage content) of BR as used herein can be measured by infrared absorption spectrometry.

Any styrene-butadiene rubber (SBR) may be used including those commonly used in the tire industry, such as emulsion-polymerized styrene-butadiene rubber (E-SBR) and solution-polymerized styrene-butadiene rubber (S-SBR). These types of SBR may be used alone, or two or more of these may be used in combination. Among these, S-SBR is preferred because it further improves fuel efficiency.

Although the amount of each rubber in the rubber component is not particularly limited and may be appropriately selected, the amount of natural rubber based on 100% by mass of the rubber component is preferably 5% by mass or more, more preferably 10% by mass or more, still more preferably 20% by mass or more, further preferably 40% by mass or more, particularly preferably 80% by mass or more, most preferably 90% by mass or more. The upper limit of the amount is not particularly critical and may be 100% by mass.

In the case where the rubber component includes a combination of natural rubber and polybutadiene rubber, the amount of polybutadiene rubber based on 100% by mass of the rubber component is, for example, preferably 20% by mass or more, more preferably 30% by mass or more, still more preferably 40% by mass or more, but is preferably 80% by mass or less, more preferably 70% by mass or less, still more preferably 60% by mass or less.

<Short Fibrous Filler>

The short fibrous filler that may be used in the present invention preferably has a fiber width of 3 to 200 nm, a fiber length of 0.2 to 10 μm, and a ratio of the fiber length to the fiber width (fiber length/fiber width) of 5 to 1,000. The incorporation of such a short fibrous filler into the rubber component provides for excellent fuel efficiency, handling stability, ride quality while maintaining a good balance between them. Furthermore, since the short fibrous filler has good dispersibility in rubber, the tensile strength of the rubber is not impaired, but maintained or improved.

The short fibrous filler has a fiber width of 3 to 200 nm. In view of rubber-reinforcing properties, it is usually preferred to incorporate a fibrous filler having a smaller fiber width into a rubber composition for tires, but such fibrous fillers with a small fiber width tend to have less orientation. Therefore, in view of the balance between rubber-reinforcing properties and fiber orientation, and dispersibility in rubber, the fiber width is preferably 10 nm or more, more preferably 20 nm or more, still more preferably 30 nm or more, but is preferably 120 nm or less, more preferably 90 nm or less, still more preferably 80 nm or less.

The short fibrous filler has a fiber length of 0.2 to 10 μm. In view of the balance between rubber-reinforcing properties and fiber orientation, and dispersibility in rubber as mentioned for the fiber width, the fiber length is preferably 0.3 μm or more, more preferably 0.5 μm or more, still more preferably 1.0 μm or more, but is preferably 7.0 μm or less, more preferably 5.0 μm or less.

The short fibrous filler has a ratio of the fiber length to the fiber width (fiber length/fiber width) of 5 to 1,000. In view of the balance between rubber-reinforcing properties and fiber orientation as mentioned for the fiber width, the ratio of the fiber length to the fiber width is preferably 6 or more, more preferably 10 or more, but is preferably 800 or less, more preferably 500 or less, still more preferably 400 or less, particularly preferably 300 or less.

The fiber width and fiber length of the short fibrous filler can be measured by, for example, image analysis of scanning atomic force micrographs, image analysis of scanning electron micrographs, image analysis of transmission micrographs, X-ray scattering data analysis, or an aperture impedance method (Coulter principle).

Short fibrous fillers have an overwhelmingly higher elastic modulus than rubber. Moreover, due to the fibrous form, they are long and easy to orient as compared to general-purpose fillers. For this reason, stress concentration is more likely to occur with short fibrous fillers than with general-purpose fillers. Taking this into consideration, the amount of the short fibrous filler per 100 parts by mass of the rubber component is preferably 1.5 to 30 parts by mass. The amount is more preferably 2.5 parts by mass or more, still more preferably 6 parts by mass or more, but is more preferably 20 parts by mass or less, still more preferably 15 parts by mass or less. When the amount of the short fibrous filler is within the above range, fatigue fracture of the rubber can be suppressed, and the effects of the present invention can be more suitably achieved.

Any short fibrous filler may be used in the present invention. The short fibrous filler having the predetermined fiber width and fiber length may be produced, for example, by fibrillation of inorganic fibers, plant fibers, animal fibers, or synthetic fibers. Specific examples include inorganic fibers such as glass fibers, sepiolite, potassium titanate fibers, and activated carbon fibers; wood pulp and microfibrillated cellulose produced by fibrillation of wood pulp; and rayon and polyester fibers.

The sepiolite may be produced, for example, by fibrillation of a sepiolite mineral $[Mg_8Si_{12}O_{30}(OH)_4(H_2O)_4 \cdot 8(H_2O)]$ which is a fibrous material. Examples include products available from Tolsa or other manufacturers. The structure of the sepiolite mineral is such that three Si—O tetrahedra are linked to form an Si—O tetrahedral sheet parallel to the fiber direction, and the sheets are joined by octahedrally coordinated magnesium ions to form a talc-like 2:1 structure. These structures are bonded to each other to form a fiber bundle which can form an aggregate.

The aggregate can be divided (fibrillated) by industrial processes such as pulverization (grinding) or chemical modifications (see, for example, EP 170299 which is incorporated by reference in its entirety herein), whereby fibers with a nanoscale diameter, i.e., delaminated (fibrillated) sepiolite, can be produced. The sepiolite mineral is preferably fibrillated without substantially destroying the fiber form of sepiolite. Examples of such fibrillation methods include wet grinding processes as described in, for example, EP 170299, JP H05-97488 A, and EP 85200094-4 which are incorporated by reference in their entirety herein.

A specific example of a wet grinding process is described. First, a moisture-containing sepiolite is ground to a particle size of 2 mm or smaller, and then water is added to a solids concentration of the suspension of 5% to 25%, followed by addition of a dispersant (e.g., an alkali salt of hexametaphosphoric acid). Next, the suspension is stirred for 5 to 15 minutes using an agitator with high shear force. Here, the following stirring regime is used: stirring for 2 to 7 minutes at a low rotational speed, and then stirring for 2 to 8 minutes at a high rotational speed. Then, the supernatant is separated by decantation or centrifugation, whereby fibrillated sepiolite can be produced without substantially destroying the fiber form.

The sepiolite encompasses attapulgite (also known as palygorskite). Attapulgite is structurally and chemically almost the same as sepiolite, except that attapulgite has a slightly smaller unit cell (shorter fiber length).

The microfibrillated cellulose may be produced, for example, by fibrillating naturally-occurring materials, including, for example: resource biomass such as fruits, grains, and root vegetables; wood, bamboo, hemp, jute, and kenaf, and pulp or paper and cloth produced therefrom; waste biomass such as agricultural waste, food waste, and sewage sludge; unused biomass such as rice straw, wheat straw, and thinnings; and celluloses produced by ascidians, acetic acid bacteria, or other organisms.

The production of the microfibrillated cellulose may be carried out by any method, such as by chemically treating the raw material of the microfibrillated cellulose with sodium hydroxide or other chemicals, followed by mechanically grinding or beating using a refiner, a twin screw kneader (twin screw extruder), a twin screw kneading extruder, a high-pressure homogenizer, a media-agitating mill, a stone mill, a grinder, a vibration mill, a sand grinder, or other devices. Other methods include ultra-high pressure treatment of the raw material of the microfibrillated cellulose.

Herein, the term "microfibrillated cellulose" refers to cellulose fibers in which cellulose molecules are aggregated into bundles to form microfibrils.

The microfibrillated cellulose may be a product available from, for example, Sugino Machine Limited. The microfibrillated cellulose may also be produced by performing the above method followed by a treatment such as oxidation or various chemical modifications.

<Other Compounding Agents>

In addition to the above-described components, the rubber composition in the present invention may contain other compounding agents conventionally used in the rubber industry. Examples include fillers other than the short fibrous filler; silane coupling agents; vulcanizing agents (crosslinking agents) such as sulfur; stearic acid; vulcanization accelerators; vulcanization activators such as stearic acid and zinc oxide; organic peroxides; plasticizers such as oils; processing aids such as curing resins, waxes, and lubricants; and antioxidants.

<Other Fillers>

The rubber composition in the present invention particularly preferably contains the short fibrous filler and an additional filler other than the short fibrous filler. The incorporation of an additional filler other than the short fibrous filler provides a reinforcement effect. Moreover, the combined use of the short fibrous filler with the additional filler other than the short fibrous filler allows the effects of the present invention to be more suitably achieved.

Examples of the additional filler include fillers usually used in rubber compositions for tires, such as carbon black, silica, calcium carbonate, alumina, clay, talc, aluminum hydroxide, and mica. These fillers may be used alone, or two or more of these may be used in combination. The additional filler is preferably carbon black and/or silica, particularly preferably carbon black, among others, because the effect produced by the combination with the short fibrous filler in the present invention can be more suitably achieved.

Any carbon black may be used, and examples include furnace black (furnace carbon black) such as SAF, ISAF, HAF, MAF, FEF, SRF, GPF, APF, FF, CF, SCF, and ECF; acetylene black (acetylene carbon black); thermal black (thermal carbon black) such as FT and MT; channel black (channel carbon black) such as EPC, MPC, and CC; and graphite. These types of carbon black may be used alone or in combination of two or more.

The carbon black preferably has a nitrogen adsorption specific surface area ($N_2SA$) of 5 $m^2/g$ or more, more preferably 20 $m^2/g$ or more, still more preferably 40 $m^2/g$ or more, further preferably 50 $m^2/g$ or more, particularly preferably 70 $m^2/g$ or more. The $N_2SA$ is also preferably 200 $m^2/g$ or less, more preferably 180 $m^2/g$ or less, still more preferably 150 $m^2/g$ or less. When the $N_2SA$ of the carbon black is within the above range, the effects of the present invention can be more significant.

Herein, the $N_2SA$ of carbon black is determined in accordance with JIS K6217-2:2001.

The carbon black preferably has a dibutyl phthalate (DBP) oil absorption of 5 mL/100 g or more, more preferably 50 mL/100 g or more, still more preferably 80 mL/100 g or more, particularly preferably 110 mL/100 g or more. The DBP is also preferably 300 mL/100 g or less, more preferably 200 mL/100 g or less, still more preferably 160 mL/100 g or less, particularly preferably 135 mL/100 g or less. When the DBP oil absorption of the carbon black is within the above range, the effects of the present invention can be more significant.

Herein, the DBP oil absorption of carbon black is measured in accordance with JIS K6217-4:2001.

The carbon black may be a product available from, for example, Asahi Carbon Co., Ltd., Cabot Japan K.K., Tokai Carbon Co., Ltd., Mitsubishi Chemical Corporation, Lion Corporation, NSCC Carbon Co., Ltd, or Columbia Carbon.

Examples of the silica include dry silica (anhydrous silica) and wet silica (hydrous silica). Among these, wet silica is preferred because it contains a large number of silanol groups.

The silica preferably has a nitrogen adsorption specific surface area ($N_2SA$) of 40 $m^2/g$ or more, more preferably 70 $m^2/g$ or more, still more preferably 110 $m^2/g$ or more, but preferably 220 $m^2/g$ or less, more preferably 200 $m^2/g$ or less. When the $N_2SA$ of the silica is within the above range, the effects of the present invention can be more significant.

Herein, the $N_2SA$ of silica is measured by the BET method in accordance with ASTM D3037-93.

The silica may be a product available from, for example, Degussa, Rhodia, Tosoh Silica Corporation, Solvay Japan, or Tokuyama Corporation.

The amount of the additional filler is preferably 5 to 200 parts by mass per 100 parts by mass of the rubber component. The amount is more preferably 10 parts by mass or more, still more preferably 20 parts by mass or more, particularly preferably 30 parts by mass or more, but is more preferably 150 parts by mass or less, still more preferably 100 parts by mass or less, particularly preferably 70 parts by mass or less. When the amount is within the above range, better fuel efficiency can be obtained.

In particular, in the case where the additional filler is carbon black, the amount of carbon black per 100 parts by mass of the rubber component is preferably 5 parts by mass or more, more preferably 10 parts by mass or more, still more preferably 20 parts by mass or more, particularly preferably 30 parts by mass or more, but is preferably 200 parts by mass or less, more preferably 150 parts by mass or less, still more preferably 100 parts by mass or less, particularly preferably 70 parts by mass or less. When the amount is within the above range, good fuel efficiency can be obtained.

<Silane Coupling Agent>

In the case where the rubber composition in the present invention contains silica, it preferably further contains a silane coupling agent. Any silane coupling agent conventionally used in combination with silica in the rubber industry may be used. Specific examples include bis(3-triethoxysilylpropyl)trisulfide, bis(3-triethoxysilylpropyl)tetrasulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazoletetrasulfide, 3-triethoxysilylpropylbenzothiazolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, and dimethoxymethylsilylpropylbenzothiazoletetrasulfide.

These silane coupling agents may be used alone, or two or more of these may be used in combination.

In order to improve fuel efficiency, silica is preferably used in combination with a silane coupling agent having a mercapto group, among others. Examples of the silane coupling agent having a mercapto group include 3-mercaptopropyltrimethoxysilane, 3-mercaptopropyltriethoxysilane, 2-mercaptoethyltrimethoxysilane, and 2-mercaptoethyltriethoxysilane.

The silane coupling agent may be a product available from, for example, Degussa, Momentive Performance Materials Inc., Shin-Etsu Silicone, Tokyo Chemical Industry Co., Ltd., AZmax. Co., or Dow Corning Toray Co., Ltd.

The amount of the silane coupling agent per 100 parts by mass of silica is preferably 3 parts by mass or more, more preferably 5 parts by mass or more, bur is preferably 15 parts by mass or less, more preferably 10 parts by mass or less. When the amount of the silane coupling agent is within the above range, a sufficient coupling effect can be obtained without leaving a large amount of residual silane coupling agent.

<Vulcanization Accelerator>

Examples of vulcanization accelerators that can be used in the present invention include thiazole vulcanization accelerators such as 2-mercaptobenzothiazole, dibenzothiazyldisulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. The amount thereof per 100 parts by mass of the rubber component is preferably 0.1 to 5 parts by mass, more preferably 0.2 to 3 parts by mass.

<Oil>

Examples of oils that can be used in the present invention include aromatic mineral oils (viscosity gravity constant (V.G.C.): 0.900 to 1.049), naphthenic mineral oils (V.G.C.: 0.850 to 0.899), and paraffinic mineral oils (V.G.C.: 0.790 to 0.849). The polycyclic aromatic content of the oil is preferably less than 3% by mass, more preferably less than 1% by mass. The polycyclic aromatic content is measured in accordance with the Institute of Petroleum (U.K.) 346/92 method. The aromatic content (CA) of the oil is preferably 20% by mass or more. These oils may be used alone, or two or more of these may be used in combination.

The oil may be a product available from, for example, Idemitsu Kosan Co., Ltd., Sankyo Yuka Kogyo K.K., JX Nippon Oil & Energy Corporation, Olisoy, H&R, Hokoku Corporation, Showa Shell Sekiyu K.K., or Fuji Kosan Co., Ltd.

<Method for Preparing Rubber Composition>

The rubber composition in the present invention can be prepared by usual methods. For example, it may be prepared by kneading the components using a rubber kneading machine such as an open roll mill or Banbury mixer, and vulcanizing the kneaded mixture. The rubber composition may also be prepared by preliminarily mixing the short fibrous filler with the rubber component, followed by mixing with other necessary compounding agents. Thus, the rubber composition in the present invention may be prepared by preparing a masterbatch containing the short fibrous filler and the rubber component, and then kneading the masterbatch with other necessary compounding agents.

In particular, in one suitable embodiment of the present invention, the rubber composition in the present invention contains a masterbatch prepared by mixing a rubber latex having a zeta potential of −100 to −20 mV with a short fibrous filler dispersion having a zeta potential of −90 to −10 mV to prepare a latex compound and adjusting the latex compound to have a zeta potential of −30 to 0 mV. In the masterbatch prepared as above, the fiber width and fiber length of the short fibrous filler can be controlled within the suitable ranges. Furthermore, the variations in the fiber width and fiber length of the short fibrous filler can be reduced, thereby providing more uniformity. Thus, tire products formed from the rubber composition containing such a masterbatch tend to have more stable and good quality. This is probably because, since the method for preparing the masterbatch includes the step of dispersing the short fibrous filler in a rubber latex (the step of preparing a latex compound), the short fibrous filler can be dispersed to a higher degree in the rubber in the rubber latex, and furthermore factors of poor dispersibility of the short fibrous filler, such as reaggregation and insufficient mixing, can be reduced, thereby resulting in further improved quality.

<Masterbatch>

The masterbatch can be prepared by a method including: step (1) of mixing a rubber latex having a zeta potential of −100 to −20 mV with a short fibrous filler dispersion having a zeta potential of −90 to −10 mV to prepare a latex compound; and step (2) of adjusting the latex compound obtained in step (1) to have a zeta potential of −30 to 0 mV. As described earlier, in the masterbatch prepared by this method, the aggregation of the short fibrous filler in the rubber is suppressed so that the short fibrous filler is highly dispersed in the rubber.

In step (1), a rubber latex having a zeta potential of −100 to −20 mV is mixed with a short fibrous filler dispersion having a zeta potential of −90 to −10 mV to prepare a latex compound.

Any rubber latex having a zeta potential within a range of −100 to −20 mV may be used, including latexes of the above-mentioned rubbers. Specific suitable examples include diene rubber latexes such as natural rubber latex, modified natural rubber latexes (saponified natural rubber latex, epoxidized natural rubber latex, etc.), and synthetic diene rubber latexes (latexes of polybutadiene rubber (BR), styrene-butadiene rubber (SBR), styrene-isoprene-butadiene rubber (SIBR), polyisoprene rubber, acrylonitrile butadiene rubber, ethylene vinyl acetate rubber, chloroprene rubber, vinyl pyridine rubber, butyl rubber, etc.). Thus, in another suitable embodiment of the present invention, the rubber latex is a diene rubber latex. These rubber latexes may be used alone, or two or more of these may be used in combination. To more suitably achieve the effects of the present invention, natural rubber latex, SBR latex, BR latex, and polyisoprene rubber latex are more preferred among these, with natural rubber latex being particularly preferred.

The zeta potential of the rubber latex can be adjusted by varying the concentration (rubber solids concentration).

To more suitably achieve the effects of the present invention, the rubber latex preferably has a zeta potential of −90 mV or higher, more preferably −80 mV or higher, particularly preferably −70 mV or higher, but preferably −30 mV or lower, more preferably −40 mV or lower, still more preferably −50 mV or lower, particularly preferably −60 mV or lower.

Herein, the zeta potential can be measured using the apparatus and conditions described later in EXAMPLES.

Natural rubber latex, which is collected as sap of natural rubber trees such as hevea trees, contains components including water, proteins, lipids, and inorganic salts as well as a rubber component. The gel fraction of the rubber is considered to be derived from a complex of various impurities therein. In the present invention, the natural rubber latex may be raw latex (field latex) taken from hevea trees by tapping, or concentrated latex prepared by concentration via centrifugation or creaming (e.g., purified latex, high ammonia latex prepared by adding ammonia in a conventional manner, or LATZ latex which has been stabilized with zinc oxide, TMTD, and ammonia).

Natural rubber latex contains honeycomb cells formed of proteins and phospholipids, and the cells tend to inhibit the incorporation of short fibrous fillers into the natural rubber. For this reason, it is often necessary to perform a treatment, such as previously removing the cells in natural rubber latex by saponification, before mixing natural rubber latex with short fibrous fillers. In contrast, the preparation method of this embodiment including steps (1) and (2), particularly step (2) of adjusting the latex compound obtained in step (1) to have a predetermined zeta potential of −30 to 0 mV, allows the short fibrous filler to be finely dispersed in the rubber, even in unsaponified natural rubber latex.

The rubber latex may be prepared by conventionally known methods, or it may be any commercial product. The rubber latex preferably has a rubber solids content (solids concentration) of 5% to 80% by mass. The rubber solids content is more preferably 7% by mass or more, still more preferably 10% by mass or more. In view of dispersibility of the short fibrous filler, it is also more preferably 70% by mass or less, still more preferably 60% by mass or less, particularly preferably 20% by mass or less.

The short fibrous filler dispersion is prepared by dispersing the short fibrous filler in a solvent. It may be any dispersion having a zeta potential within a range of −90 to −10 mV. Usually, the solvent may suitably be water. Examples of solvents other than water include water-soluble alcohols, ethers, and ketones.

The zeta potential of the short fibrous filler dispersion can be adjusted by varying the concentration (short fibrous filler solids concentration) or the type of solvent.

To more suitably achieve the effects of the present invention, the zeta potential of the short fibrous filler dispersion is preferably −80 mV or higher, more preferably −70 mV or higher, still more preferably −50 mV or higher, but is preferably −12 mV or lower, more preferably −15 mV or lower.

The short fibrous filler dispersion can be prepared by any method including known methods. For example, it may be prepared by dispersing the short fibrous filler in the solvent using a high-speed homogenizer, an ultrasonic homogenizer, a high-pressure homogenizer, a colloid mill, a blender mill, or other devices. The temperature and duration of the preparation may be appropriately selected within usual ranges so that the short fibrous filler can be sufficiently dispersed in the solvent.

The amount (solids content, solids concentration) of the short fibrous filler in the short fibrous filler dispersion is not particularly limited. In view of dispersibility of the short fibrous filler in the dispersion, the amount of the short fibrous filler based on 100% by mass of the short fibrous filler dispersion is preferably 0.2% to 20% by mass, more preferably 0.3% to 10% by mass, still more preferably 0.4% to 3% by mass, particularly preferably 0.5% to 1% by mass.

In step (1), the mode of mixing the rubber latex with the short fibrous filler dispersion is not particularly limited as long as the rubber latex is able to be mixed with the short fibrous filler dispersion. Compounding agents other than the rubber latex and the short fibrous filler dispersion, such as a binder, may further be added.

In step (1), the rubber latex may be mixed with the short fibrous filler dispersion by any method. Examples include: a method in which the rubber latex is placed and stirred in a known stirring device such as a high-speed homogenizer, ultrasonic homogenizer, colloid mill, or blender mill while dropwise adding the short fibrous filler dispersion; a method in which the short fibrous filler dispersion is placed and stirred in such a known stirring device while dropwise adding the rubber latex; and a method in which the rubber latex and the short fibrous filler dispersion are placed, stirred, and mixed in such a known stirring device. Accordingly, a latex compound is obtained.

The latex compound preferably has a zeta potential of −90 mV or higher, more preferably −80 mV or higher, particularly preferably −70 mV or higher, but preferably −30 mV or lower, more preferably −40 mV or lower, still more preferably −50 mV or lower, particularly preferably −60 mV or lower. The latex compound having a zeta potential within the above range will be stable with little degradation.

In step (1), the components are preferably incorporated so that the amounts of the components, including the rubber solids (rubber component) in the rubber latex and the short fibrous filler, in the rubber composition of the present invention are adjusted as indicated above. In this case, the effects of the present invention can be more suitably achieved.

In step (1), to obtain a homogeneous latex compound, the temperature and duration of mixing of the rubber latex and the short fibrous filler dispersion are preferably 10° C. to 40° C. for 3 to 120 minutes, more preferably 15° C. to 35° C. for 5 to 90 minutes.

In view of dispersibility of the solids in the latex compound, the total concentration of the solids (total solids content, total solids concentration) in the latex compound is preferably 0.5% by mass or more, more preferably 1% by mass or more, but is preferably 30% by mass or less, more preferably 10% by mass or less, still more preferably 5% by mass or less, based on 100% by mass of the latex compound.

Step (1) is followed by step (2) of adjusting the latex compound obtained in step (1) to have a zeta potential of −30 to 0 mV. By adjusting the zeta potential within the above range, it is possible to suppress aggregation of the short fibrous filler to thereby finely and highly disperse the short fibrous filler in the rubber. The zeta potential is preferably −2 mV or lower, more preferably −5 mV or lower, but is preferably −20 mV or higher, more preferably −15 mV or higher, still more preferably −10 mV or higher.

In step (2) in which the zeta potential of the latex compound is adjusted to −30 to 0 mV, a coagulation reaction of the latex compound naturally proceeds simultaneously with the process of adjusting the zeta potential. Herein, the expression "the zeta potential of the latex compound is adjusted to −30 to 0 mV in step (2)" means that the latex compound has a zeta potential within a range of −30 to 0 mV after a time period long enough to substantially allow the coagulation reaction of the latex compound to sufficiently proceed and complete in the process of adjusting the zeta potential.

In step (2), the zeta potential of the latex compound obtained in step (1) may be adjusted to −30 to 0 mV by any method, preferably by placing and stirring the latex compound in a stirring device while adding an acid and/or a salt, particularly preferably an acid and a salt. Moreover, in view of dispersibility of the short fibrous filler, the acid and/or salt are/is preferably added stepwise, i.e., introduced stepwise (in portions of the total amount). In a particularly preferred embodiment, an acid is introduced stepwise and then a salt is introduced stepwise.

The amount of the acid and/or salt to be added may be determined while continuously or intermittently measuring the zeta potential of the latex compound.

Examples of the acid include formic acid, sulfuric acid, hydrochloric acid, and acetic acid. Examples of the salt include monovalent to trivalent metal salts such as sodium chloride, magnesium chloride, and calcium salts (calcium nitrate, calcium chloride, etc.). Calcium chloride is preferred among these.

Examples of the stirring device include known stirring devices such as high-speed homogenizers, ultrasonic homogenizers, colloid mills, blender mills, and electronically controlled stirring devices. In view of dispersibility of the short fibrous filler, it is preferred to use an electronically controlled stirring device. The conditions during the stirring may be appropriately selected within a usual range. In view of dispersibility of the short fibrous filler, for example, the stirring speed is preferably 10 to 500 rpm, more preferably 50 to 200 rpm. The temperature and duration of stirring are preferably 10° C. to 40° C. for 3 to 120 minutes, more preferably 15° C. to 35° C. for 5 to 90 minutes.

Upon adjusting the zeta potential of the latex compound to −30 to 0 mV in step (2), the temperature of the latex compound is preferably 10° C. to 40° C. in view of dispersibility of the short fibrous filler. It is more preferably 35° C. or lower.

Also upon adjusting the zeta potential of the latex compound to −30 to 0 mV in step (2), a flocculant may be added to control the simultaneous coagulation (the size of coagulated particle aggregate). Examples of the flocculant include cationic polymers.

A coagulum is formed through step (2). The coagulum (containing the coagulated rubber and the short fibrous filler) formed in step (2) may be filtered and dried by known methods as needed, followed by rubber kneading using a two-roll mill, three-roll mill, Banbury mixer, or other kneading machines, for example preferably at 50° C. to 90° C. for 1 to 60 minutes, more preferably at 60° C. to 85° C. for 3 to 30 minutes, to obtain a masterbatch in which the short fibrous filler is finely and highly dispersed in the rubber matrix. The masterbatch may contain other components as long as the effects of the present invention are not hindered.

<Pneumatic Tire>

The rubber composition in the present invention can be used to form tire components, such as cap treads, base treads, undertreads, clinch apexes, bead apexes, sidewalls, breaker cushion rubbers, carcass cord topping rubbers, run flat-reinforcing layers, insulations, chafers, and innerliners, particularly suitably sidewalls, base treads, and innerliners. These tire components can be suitably formed from the rubber composition satisfying all relationships (1) to (3) because the direction along which the components are extruded or rolled corresponds to the circumferential direction of the tire, which makes it possible to easily control the speed difference of the equipment or the orientation of the short fibrous filler.

Thus, another suitable embodiment of the present invention is a pneumatic tire including a tire component formed from the rubber composition in the present invention, wherein the tire component is at least one selected from the group consisting of a sidewall, a base tread, and an innerliner.

In the production of the tire component from the rubber composition in the present invention, the tire component may be formed only of the rubber composition in the present invention or formed as a stack of two or more layers including at least one layer formed from the rubber composition in the present invention. In particular, highly stretched rubber materials containing oriented fibrous fillers may have anisotropy and therefore deteriorated resistance to cutting in the oriented direction of the material. Hence, for use in off-road tires, for example, if a layer of the rubber composition in the present invention is provided as an inner layer of a stack of two or more layers, it is possible to maintain durability on off-roads while achieving the effects of the present invention. Thus, in another suitable embodiment of the present invention, the tire component is formed as a stack of two or more layers including at least one layer formed from the rubber composition in the present invention.

An example of the embodiment in which the tire component is formed as a stack of two or more layers including at least one layer formed from the rubber composition in the present invention may be an embodiment in which the tire component is a sidewall, the sidewall includes a stack of two or more layers including an outer sidewall layer that forms an outer surface of the tire and an inner sidewall layer disposed axially inwardly of the outer sidewall layer, and the inner sidewall layer is formed from the rubber composition in the present invention. With the sidewall according to such an embodiment, the effect provided by including a layer of the rubber composition in the present invention as an inner layer of a stack of two or more layers can be obtained.

In a preferred embodiment, the pneumatic tire of the present invention includes: a sidewall including a stack of two or more layers including an outer sidewall layer that forms an outer surface of the tire and an inner sidewall layer disposed axially inwardly of the outer sidewall layer; and a carcass coated with a topping rubber disposed axially inwardly of the inner sidewall layer, wherein the inner sidewall layer is formed from the rubber composition in the present invention, and the distance from the outer surface of the outer sidewall layer to the outer surface of the topping rubber at a position where the tire with a specified internal pressure has the maximum width is less than 3.5 mm. For example, a pneumatic tire in which the distance from the outer surface of the outer sidewall layer to the outer surface of the topping rubber at a position where the tire has the maximum width (hereinafter, also referred to simply as "sidewall thickness") is 3.5 mm or more may in some cases satisfy the handling stability and ride quality demanded by the market, even when the inner sidewall layer is formed from a rubber composition that does not satisfy relationship (1) or (2). This is probably because total energy loss increases with increase in rubber amount, and the input of road roughness can be reduced by rubber. However, pneumatic tires with such a large sidewall thickness usually have high energy loss and therefore inferior fuel efficiency. In contrast, since the pneumatic tire of the present invention includes a tire component formed from a rubber composition which has cured rubber properties satisfying all relationships (1) to (3), the tire has excellent fuel efficiency, handling stability, ride quality while maintaining a good balance between them. Particularly in the case where the pneumatic tire includes an inner sidewall layer formed from a rubber composition which has cured rubber properties satisfying all relationships (1) to (3), and has a sidewall thickness of less than 3.5 mm, the tire has a reduced weight due to the thin sidewall and has excellent fuel efficiency; furthermore, since the tire includes an inner sidewall layer formed from a rubber composition which has cured rubber properties satisfying all relationships (1) to (3), the tire has very excellent fuel efficiency, handling stability, and ride quality while maintaining a good balance between them.

Figure 1:
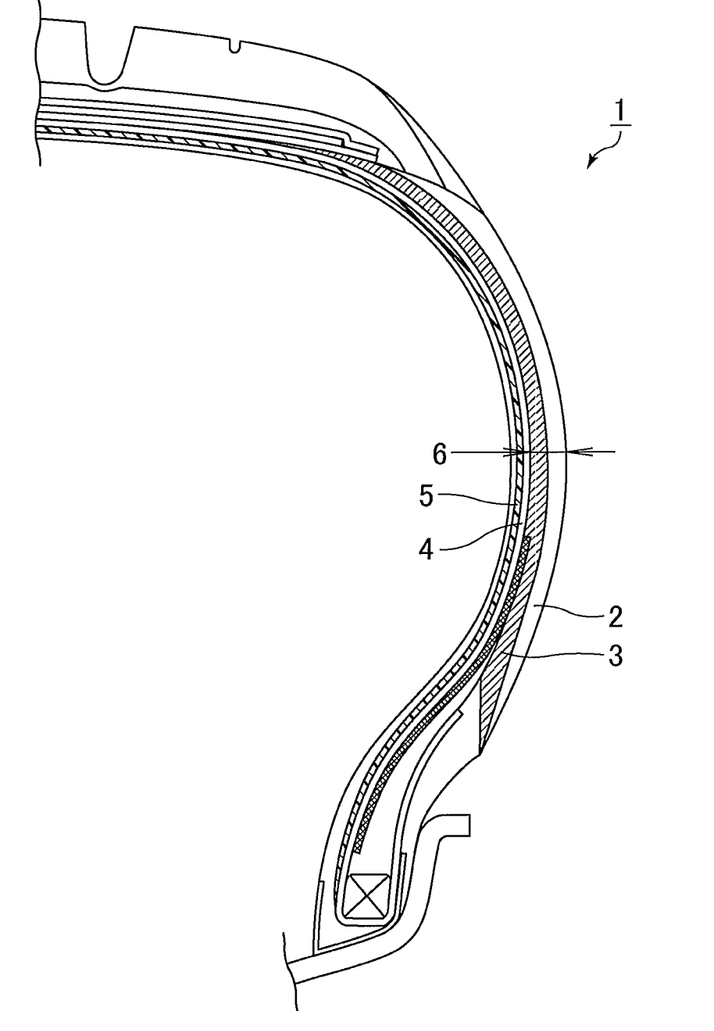
FIG. 1 is a schematic diagram illustrating a part (upper right half) of a cross-section of a tire according to one embodiment of the present invention.

One example of the pneumatic tire of the present invention will be described below with reference to a drawing.

An exemplary structure of the pneumatic tire of the present invention is illustrated in FIG. 1 which shows the upper right half of a tire cross-section.

The side portion of a pneumatic tire 1 includes: a sidewall composed of an outer sidewall layer 2 that forms an outer surface of the tire and an inner sidewall layer 3 disposed adjacent to the axially inner side of the outer sidewall layer 2; and a carcass 5 coated with a topping rubber 4 disposed adjacent to the axially inner side of the inner sidewall layer 3. The distance from the outer surface of the outer sidewall layer 2 to the outer surface of the topping rubber 4 at a position where the tire with a specified internal pressure has the maximum width (sidewall thickness 6) is less than 3.5 mm.

The pneumatic tire of the present invention can be formed from the rubber composition by usual methods. Specifically, an unvulcanized rubber composition containing the components is extruded into the shape of a tire component (for example, a sidewall) and then assembled with other tire components in a usual manner on a tire building machine to build an unvulcanized tire. The unvulcanized tire is heated and pressurized in a vulcanizer, whereby a pneumatic tire of the present invention can be produced.

The pneumatic tire of the present invention can be suitably used for passenger vehicles, trucks and buses, two-wheeled vehicles, racing vehicles, or other vehicles, and particularly for passenger vehicles.

EXAMPLES

The present invention will be specifically described with reference to, but not limited to, examples.

The chemicals used in the examples and comparative examples are listed below.

NR: natural rubber, RSS#3 grade
BR: polybutadiene rubber (cis content: 97% by mass)
Short plant fiber 1: cellulose fiber (fiber width: 3 to 20 μm, fiber length: 200 to 1,200 μm, ratio of fiber length to fiber width (fiber length/fiber width): 10 to 200)
Short plant fiber 2: TEMPO-oxidized microfibrillated cellulose (microfibrillated cellulose oxidized with TEMPO) prepared in Production Example 1
Short plant fiber 3: microfibrillated cellulose (fiber width: 20 to 50 nm, fiber length: 200 to 5,000 nm, ratio of fiber length to fiber width (fiber length/fiber width): 10 to 200)
Masterbatch 1: masterbatch prepared in Production Example 2
Masterbatch 2: masterbatch prepared in Production Example 3
Inorganic short fiber 1: sepiolite (fiber width: 5 to 30 nm, fiber length: 200 to 2,000 nm, ratio of fiber length to fiber width (fiber length/fiber width): 8 to 400)
Inorganic short fiber 2: sepiolite (fiber width: 5 to 30 nm, fiber length: 200 to 5,000 nm, ratio of fiber length to fiber width (fiber length/fiber width): 8 to 800)
Carbon black 1: carbon black (N220, $N_2SA$: 120 $m^2/g$, DBP oil absorption: 115 mL/g)
Carbon black 2: carbon black (N550, $N_2SA$: 45 $m^2/g$, DBP oil absorption: 115 mL/g)
Silica: silica ($N_2SA$: 160 $m^2/g$)
Silane coupling agent: Si266 (bis(3-triethoxysilyl-propyl) disulfide) available from Degussa
Oil: aromatic oil
Zinc oxide: zinc oxide #1 available from Mitsui Mining & Smelting Co., Ltd.
Stearic acid: stearic acid "TSUBAKI" available from NOF Corporation
Wax: SUNNOC N available from Ouchi Shinko Chemical Industrial Co., Ltd.
Antioxidant: N-(1,3-dimethylbutyl)-N'-phenyl-p-phenylenediamine
Sulfur: powdered sulfur available from Tsurumi Chemical Industry Co., Ltd.
Vulcanization accelerator: N-tert-butyl-2-benzothiazolylsulfenamide The chemicals used in the production examples are listed below.

TEMPO: 2,2,6,6-tetramethyl-1-piperidine-N-oxyradical
Microfibrillated plant fiber: microfibrillated cellulose (solids content: 2% by mass, moisture content: 98% by mass, average fiber diameter: 20 to 50 nm, average fiber length: 500 to 1,000 nm)
Natural rubber latex: Hytex Latex (high ammonia type, solids concentration: 60% by mass) available from Nomura Trading Co., Ltd.

Production Example 1: Production of TEMPO-Oxidized Microfibrillated Cellulose

An amount of 5.00 g (dry weight) of an undried bleached softwood kraft pulp (consisting mainly of fibers having a fiber diameter of more than 1,000 nm), 39 mg of TEMPO, and 514 mg of sodium bromide were dispersed in 500 mL of water. To the dispersion was added a 15% by mass sodium hypochlorite aqueous solution so that the amount of sodium hypochlorite was 5.5 mmol per g of absolute dry pulp to initiate a reaction. During the reaction, the pH was maintained at 10.0 by dropwise adding a 3M NaOH aqueous solution. The reaction was considered to complete when there was no more change in pH. The reaction product was filtered through a glass filter, followed by five cycles of washing with a plenty of water and filtration, thereby obtaining a water-impregnated reaction fiber with a solids content of 15% by mass.

Next, water was added to the reaction fiber to give a slurry with a solids content of 1% by mass. To 4 g (absolute dry weight) of the oxidized cellulose were added 1.5 mL of 1M NaOH and 0.5 mL of 30% aqueous hydrogen peroxide, and the mixture was adjusted to 5% (w/v) by addition of ultra-pure water. The resulting mixture was heated in an autoclave at 80° C. for two hours.

The unwashed, alkali-hydrolyzed oxidized cellulose was treated three times in an ultra-high-pressure homogenizer (under a treatment pressure of 140 MPa) to give a transparent gel dispersion. The transparent gel was suction-filtered and then subjected to quick drying in an oven at 100° C. to obtain a TEMPO-oxidized microfibrillated cellulose. The fiber width and fiber length were determined as described below and it was found that the fiber width was 250 to 500 nm, the fiber length was 3 to 6 μm, and the ratio of the fiber length to the fiber width (fiber length/fiber width) was 6 to 24.

(Determination of Fiber Width and Fiber Length)

A 0.001% by mass aqueous dispersion of the TEMPO-oxidized microfibrillated cellulose was prepared. The diluted dispersion was thinly spread on a mica sample stage and heat-dried at 50° C. to prepare an analysis sample. The sample was analyzed using an atomic force microscope (AFM, Hitachi High-Tech Science Corporation, product name: Scanning probe microscope SPI3800N), and the cross-sectional height profiles of the topographic image were measured to determine the fiber width and fiber length.

Production Example 2: Production of Masterbatch 1

An amount of 1,000 g of pure water was added to 500 g of the microfibrillated plant fiber to prepare a 0.5% by mass (solids concentration) suspension of the microfibrillated plant fiber. The suspension was stirred for about five minutes using a high-speed homogenizer ("T50" available from IKA Japan, rotational speed: 8,000 rpm) to give a homogeneous aqueous dispersion (viscosity: 7 to 8 mPa·s).

The solids concentration (DRC) of the natural rubber latex was adjusted to 10% by mass, and then the aqueous dispersion prepared as above was added to the natural rubber latex so that the dry weight (solids content) of the microfibrillated plant fiber was 20 parts by mass per 100 parts by mass of the rubber solids in the natural rubber latex, followed by stirring and mixing at 25° C. for five minutes using a high-speed homogenizer ("T50" available from IKA Japan, rotational speed: 8,000 rpm) to prepare a rubber latex dispersion (latex compound) (total solids concentration: 2% by mass). Next, a 1% by mass formic acid aqueous solution was added to the latex compound with slow stirring at 25° C. for five minutes using an Eurostar (electronically controlled stirring device) (IKA Japan, rotational speed: 100 rpm) to adjust the zeta potential to −30 mV. Subsequently, a 1% by mass calcium chloride aqueous solution was added to adjust the zeta potential to −10 mV, thereby obtaining a coagulum. The coagulum was filtered and dried at 80° C. for six hours to obtain Masterbatch 1. A 0.001% by mass aqueous dispersion of Masterbatch 1 was prepared, and the fiber width and fiber length were determined as in Production Example 1 and it was found that the fiber width was 50 to 80 nm, the fiber length was 1 to 2 μm, and the ratio of the fiber length to the fiber width (fiber length/fiber width) was 13 to 40.

The zeta potential was measured using the apparatus and conditions described below.
Measurement apparatus: zeta potential analyzer "ELS-PT" available from Otsuka Electronics Co., Ltd.
Measurement conditions:
A pH titrator was used.
pH titration mode
Solvent: water
Temperature: 25° C.
Dielectric constant: 78.22
Viscosity: 0.8663 cp
Refractive index: 1.3312

The zeta potentials of the natural rubber latex (solids concentration: 10% by mass), the aqueous dispersion of the microfibrillated plant fiber (solids concentration: 0.5% by mass), and the latex compound (total solids concentration: 2% by mass) were measured as above and found as follows.
Natural rubber latex (solids concentration: 10% by mass): −65 mV
Aqueous dispersion of microfibrillated plant fiber (solids concentration: 0.5% by mass): −40 mV
Latex compound (total solids concentration: 2% by mass): −60 mV Production Example 3: Production of Masterbatch 2

Masterbatch 2 was prepared as in Production Example 2, except that after the zeta potential was adjusted to −10 mV to obtain a coagulum, which was then filtered and dried at 80° C. for six hours, the resulting product was further kneaded in a three-roll mill at 80° C. for five minutes. A 0.001% by mass aqueous dispersion of Masterbatch 2 was prepared, and the fiber width and fiber length were determined as in Production Example 1 and it was found that the fiber width was 10 to 30 nm, the fiber length was 0.5 to 1 μm, and the ratio of the fiber length to the fiber width (fiber length/fiber width) was 18 to 100.

Examples and Comparative Examples

The materials other than the sulfur and the vulcanization accelerator in the formulation amounts indicated in Table 1 were kneaded using a Banbury mixer (Kobe Steel, Ltd.) to give a kneaded mixture. Then, the sulfur and vulcanization accelerator were added to the kneaded mixture, and they were kneaded using an open roll mill to obtain an unvulcanized rubber composition. Sheets with a thickness of 0.5 mm were prepared from the unvulcanized rubber composition using an open roll mill. The unvulcanized rubber sheets were stacked into a 1.5 mm-thick sheet and press-vulcanized at 150° C. for 15 minutes to obtain a vulcanized rubber sheet.

Separately, the unvulcanized rubber sheet (thickness: 0.5 mm) was formed into an inner sidewall layer and assembled with other tire components to build an unvulcanized tire. The unvulcanized tire was press-vulcanized at 160° C. for 10 minutes to prepare a test tire having the structure illustrated in FIG. 1. The tire specification is as follows.
Size: 195/65R15
Sidewall: composed of an inner sidewall layer and an outer sidewall layer.
Outer sidewall layer: formed from the unvulcanized rubber composition of Comparative Example 1.
Sidewall thickness at a position where the tire with a specified internal pressure has the maximum width: 2.5 mm.

The vulcanized rubber sheets and test tires prepared as above were evaluated as follows. Table 1 shows the results.
(Viscoelasticity Test)

Rubber samples were cut out from the sidewall portion of the test tires to prepare rubber sheets with a thickness of 1.5 mm. Strip specimens for property evaluation were punched out of the rubber sheets in the circumferential direction of the tire and in a direction orthogonal to the tire circumferential direction.

The complex modulus E* of the test specimens was measured using a spectrometer (Ueshima Seisakusho Co., Ltd.) at an initial strain of 10%, a dynamic strain amplitude (dynamic strain) of 1%, a frequency of 10 Hz, and a temperature of 50° C. The complex modulus of the specimens punched out in the tire circumferential direction was defined as the complex modulus E*a in the tire circumferential direction, while the complex modulus of the specimens punched out in a direction orthogonal to the tire circumferential direction was defined as the complex modulus E*b in a direction orthogonal to the tire circumferential direction.

Separately, the loss tangent tan δ of the test specimens punched out in the tire circumferential direction was measured using a spectrometer (Ueshima Seisakusho Co., Ltd.) at an initial strain of 10%, a dynamic strain amplitude (dynamic strain) of 1%, a frequency of 10 Hz, and a temperature of 50° C. A lower tan δ indicates that the tire has higher fuel efficiency. Tires with a tan δ of 0.11 or lower were considered as having sufficient fuel efficiency and excellent fuel efficiency.

(Hardness)

The hardness (HS) at 50° C. of the rubber test pieces (vulcanized rubber sheets) was measured in accordance with JIS K 6253-1 "Rubber, vulcanized or thermoplastic—Determination of hardness" using a type A durometer.

The values of the following relationships (2) and (3) were calculated from the measured E*a, E*b, and HS.

$$1.10 \leq (E^*a/E^*b) \leq 1.53 \quad (2)$$

$$0.072 \leq (E^*a/HS) \leq 0.140 \quad (3)$$

(Tensile Test)

A tensile test was performed using No. 3 dumbbell specimens prepared from each vulcanized rubber sheet in accordance with JIS K 6251 "Rubber, vulcanized or thermoplastics—Determination of tensile stress-strain properties" to determine the elongation at break (tensile elongation: EB (%)) and tensile strength at break (tensile breaking strength: TB (MPa)) of the vulcanized rubber sheet. The tensile strength was calculated from the values using the equation below, and expressed as an index (tensile strength index), with Comparative Example 1 set equal to 100. A higher index indicates better tensile strength.

Tensile strength = $EB \times TB/2$ (Handling Stability)

The test tires were mounted on all wheels of a front-engine, front-wheel-drive car of 2,000 cc displacement made in Japan. A test driver drove the car at a temperature of 20° C. to 25° C. on a test course of Sumitomo Rubber Industries, Ltd. in Okayama, Japan. The driver subjectively rated steering linearity and cornering performance. These ratings were made on a scale of 1 to 10 (best) by comparison with Comparative Example 1 given a rating of 6. A higher rating indicates better handling stability. Tires with higher ratings and a smaller gap between steering linearity and cornering performance are considered better. According to the relative rating systems for steering linearity and cornering performance in which Comparative Example 1 was given a rating of 6, tires with each rating higher than 6 were considered as having sufficient handling stability and excellent handling stability.

(Ride Quality)

The test tires were mounted on all wheels of a front-engine, front-wheel-drive car of 2,000 cc displacement made in Japan. A test driver drove the car at a temperature of 20° C. to 25° C. on a test course of Sumitomo Rubber Industries, Ltd. in Okayama, Japan. The driver subjectively rated ride quality. The ratings were made on a scale of 1 to 10 (best) by comparison with Comparative Example 1 given a rating of 6. A higher rating indicates better ride quality and more comfortable running. In the relative rating system for ride quality in which Comparative Example 1 was given a rating of 6, tires with a rating of 6 or higher were considered as having sufficient ride quality and excellent ride quality.

TABLE 1

|  |  |  | Comparative Example | | | | | | |
|---|---|---|---|---|---|---|---|---|---|
|  |  |  | 1 | 2 | 3 | 4 | 5 | 6 | 7 |
| Formulation (parts by mass) | NR |  | 50 | 50 | 50 | 50 | 50 | 50 | 50 |
|  | BR |  | 50 | 50 | 50 | 50 | 50 | 50 | 50 |
|  | Short plant fiber 1 |  | — | — | — | 8 | — | 2 | 2 |
|  | Short plant fiber 2 |  | — | — | — | — | 10 | — | — |
|  | Short plant fiber 3 |  | — | — | — | — | — | — | — |
|  | Masterbatch 1 | (Natural rubber solids: 100 parts by mass) (Microfibrillated plant fiber: 20 parts by mass) | — | — | — | — | — | — | — |
|  | Masterbatch 2 | (Natural rubber solids: 100 parts by mass) (Microfibrillated plant fiber: 20 parts by mass) | — | — | — | — | — | — | — |
|  | Inorganic short fiber 1 |  | — | — | — | — | — | — | — |
|  | Inorganic short fiber 2 |  | — | — | — | — | — | — | — |
|  | Carbon black 1 |  | 40 | — | 5 | 40 | 40 | 35 | — |
|  | Carbon black 2 |  | — | 55 | — | — | — | — | 45 |
|  | Silica |  | — | — | 55 | — | — | — | — |
|  | Silane coupling agent |  | — | — | 5.5 | — | — | 8 | 13 |
|  | Oil |  | 5 | 5 | 5 | 7 | 7 | 5 | 7 |
|  | Zinc oxide |  | 2 | 2 | 2 | 2 | 2 | 2 | 2 |
|  | Stearic acid |  | 2 | 2 | 2 | 2 | 2 | 2 | 2 |
|  | Wax |  | 0.5 | 0.5 | 0.5 | 0.5 | 0.5 | 0.5 | 0.5 |
|  | Antioxidant |  | 2 | 2 | 2 | 2 | 2 | 2 | 2 |
|  | Sulfur |  | 2.5 | 2.5 | 3.5 | 2.5 | 2.5 | 2.5 | 2.5 |
|  | Vulcanization accelerator |  | 1.5 | 1.5 | 1.5 | 1.5 | 1.5 | 1.5 | 1.5 |
| Rubber properties | HS |  | 53 | 64 | 64 | 63 | 63 | 50 | 54 |
|  | E*a |  | 4.35 | 9.24 | 9.14 | 7.99 | 7.64 | 3.56 | 4.22 |
|  | E*b |  | 4.11 | 8.77 | 8.45 | 4.24 | 4.97 | 3.21 | 3.81 |
|  | Value of (E*a/E*b) in formula (2) |  | 1.06 | 1.05 | 1.08 | 1.88 | 1.54 | 1.11 | 1.11 |
|  | Value of (E*a/HS) in formula (3) |  | 0.082 | 0.144 | 0.143 | 0.127 | 0.121 | 0.071 | 0.078 |
|  | Value of (tan δ) in formula (1) |  | 0.068 | 0.128 | 0.108 | 0.109 | 0.097 | 0.064 | 0.117 |
| Property evaluation | Tensile strength index |  | 100 | 138 | 95 | 84 | 92 | 91 | 84 |
|  | Handling stability (Steering linearity) |  | 6 | 7 | 7 | 6.5 | 6.5 | 5.75 | 6 |
|  | Handling stability (Cornering performance) |  | 6 | 7 | 7 | 5.5 | 5.75 | 5.5 | 5.75 |
|  | Ride quality |  | 6 | 4.5 | 4 | 6.5 | 6.5 | 6.25 | 6.25 |

TABLE 1-continued

|  |  |  | Comparative Example | Example | | | | |
|---|---|---|---|---|---|---|---|---|
|  |  |  | 8 | 1 | 2 | 3 | 4 | 5 |
| Formulation (parts by mass) | NR |  | 50 | 50 | 37.5 | — | — | — |
|  | BR |  | 50 | 50 | 50 | 50 | — | 50 |
|  | Short plant fiber 1 |  | 6 | — | — | — | — | — |
|  | Short plant fiber 2 |  |  |  |  |  |  |  |
|  | Short plant fiber 3 |  | — | 10 | — | — | — | — |
|  | Masterbatch 1 | (Natural rubber solids: 100 parts by mass) (Microfibrillated plant fiber. 20 parts by mass) | — | — | 15 | 60 | 120 | — |
|  | Masterbatch 2 | (Natural rubber solids: 100 parts by mass) (Microfibrillated plant fiber. 20 parts by mass) | — | — | — | — | — | 60 |
|  | Inorganic short fiber 1 |  | — | — | — | — | — | — |
|  | Inorganic short fiber 2 |  | — | — | — | — | — | — |
|  | Carbon black 1 |  | 15 | 40 | 40 | 40 | 30 | 40 |
|  | Carbon black 2 |  | 25 | — | — | — | — | — |
|  | Silica |  | — | — | — | — | — | — |
|  | Silane coupling agent |  | — | — | — | — | — | — |
|  | Oil |  | 13 | 7 | 7 | 7 | 10 | 7 |
|  | Zinc oxide |  | 2 | 2 | 2 | 2 | 2 | 2 |
|  | Stearic acid |  | 2 | 2 | 2 | 2 | 2 | 2 |
|  | Wax |  | 0.5 | 0.5 | 0.5 | 0.5 | 0.5 | 0.5 |
|  | Antioxidant |  | 2 | 2 | 2 | 2 | 2 | 2 |
|  | Sulfur |  | 2.5 | 2.5 | 2.5 | 2.5 | 2.5 | 2.5 |
|  | Vulcanization accelerator |  | 1.5 | 1.5 | 1.5 | 1.5 | 1.5 | 1.5 |
| Rubber properties | HS |  | 62 | 62 | 55 | 62 | 63 | 62 |
|  | E*a |  | 8.99 | 7.12 | 5.12 | 6.99 | 7.13 | 6.99 |
|  | E*b |  | 6.74 | 5.42 | 4.35 | 5.81 | 5.54 | 6.14 |
|  | Value of (E*a/E*b) in formula (2) |  | 1.33 | 1.31 | 1.18 | 1.20 | 1.29 | 1.14 |
|  | Value of (E*a/HS) in formula (3) |  | 0.145 | 0.115 | 0.093 | 0.113 | 0.113 | 0.113 |
|  | Value of (tan δ) in formula (1) |  | 0.099 | 0.092 | 0.074 | 0.088 | 0.102 | 0.081 |
| Property evaluation | Tensile strength index |  | 74 | 102 | 104 | 106 | 101 | 110 |
|  | Handling stability (Steering linearity) |  | 7 | 6.75 | 6.25 | 6.75 | 6.5 | 6.75 |
|  | Handling stability (Cornering performance) |  | 6.75 | 6.5 | 6.25 | 6.5 | 6.5 | 6.5 |
|  | Ride quality |  | 5 | 6.5 | 6 | 6.25 | 6.5 | 6.25 |

|  |  |  | Example | | | | |
|---|---|---|---|---|---|---|---|
|  |  |  | 6 | 7 | 8 | 9 | 10 |
| Formulation (parts by mass) | NR |  | 50 | 50 | 60 | 37.5 | 60 |
|  | BR |  | 50 | 50 | 40 | 50 | 40 |
|  | Short plant fiber 1 |  | — | — | — | — | — |
|  | Short plant fiber 2 |  | — | — | — | — | — |
|  | Short plant fiber 3 |  | — | — | 15 | — | 15 |
|  | Masterbatch 1 | (Natural rubber solids: 100 parts by mass) (Microfibrillated plant fiber. 20 parts by mass) | — | — | — | 15 | — |
|  | Masterbatch 2 | (Natural rubber solids: 100 parts by mass) (Microfibrillated plant fiber. 20 parts by mass) | — | — | — | — | — |
|  | Inorganic short fiber 1 |  | 8 | — | — | — | — |
|  | Inorganic short fiber 2 |  | — | 8 | — | — | — |
|  | Carbon black 1 |  | 40 | 40 | 35 | 38 | 25 |
|  | Carbon black 2 |  | — | — | — | — | 10 |
|  | Silica |  | — | — | — | — | — |
|  | Silane coupling agent |  | — | — | — | — | — |
|  | Oil |  | 7 | 7 | 10 | 12 | 12 |
|  | Zinc oxide |  | 2 | 2 | 2 | 2 | 2 |
|  | Stearic acid |  | 2 | 2 | 2 | 2 | 2 |
|  | Wax |  | 0.5 | 0.5 | 0.5 | 0.5 | 0.5 |
|  | Antioxidant |  | 2 | 2 | 2 | 2 | 2 |
|  | Sulfur |  | 2.5 | 2.5 | 2.5 | 2.5 | 2.5 |
|  | Vulcanization accelerator |  | 1.5 | 1.5 | 1.5 | 2 | 1.5 |
| Rubber properties | HS |  | 62 | 62 | 61 | 55 | 60 |
|  | E*a |  | 7.24 | 7.36 | 8.02 | 4.22 | 8.41 |
|  | E*b |  | 6.51 | 6.21 | 5.24 | 3.62 | 5.69 |
|  | Value of (E*a/E*b) in formula (2) |  | 1.11 | 1.19 | 1.53 | 1.17 | 1.48 |

TABLE 1-continued

|  |  |  |  |  |  |  |
|---|---|---|---|---|---|---|
|  | Value of (E*a/HS) in formula (3) | 0.117 | 0.119 | 0.131 | 0.077 | 0.140 |
|  | Value of (tan δ) in formula (1) | 0.084 | 0.09 | 0.107 | 0.072 | 0.109 |
| Property evaluation | Tensile strength index | 108 | 105 | 100 | 100 | 100 |
|  | Handling stability (Steering linearity) | 6.75 | 6.75 | 6.75 | 6.25 | 6.75 |
|  | Handling stability (Cornering performance) | 6.5 | 6.5 | 6.75 | 6.25 | 6.5 |
|  | Ride quality | 6.25 | 6.25 | 6.25 | 6.5 | 6.25 |

The results demonstrate that the pneumatic tires of the examples including a tire component formed from a rubber composition which had after vulcanization predetermined tan δ, E*, and HS exhibited excellent fuel efficiency, handling stability, and ride quality while maintaining a good balance between them.

REFERENCE SIGNS LIST

1 Pneumatic tire
2 Outer sidewall layer
3 Inner sidewall layer
4 Topping rubber
5 Carcass
6 Sidewall thickness (at a position where the tire has the maximum width)

The invention claimed is:

1. A pneumatic tire, comprising a tire component formed from a rubber composition,
   the rubber composition having cured rubber properties satisfying all relationships (1) to (3):

$$\tan \delta \leq 0.11 \quad (1),$$

$$1.10 \leq (E^*a/E^*b) \leq 1.53 \quad (2), \text{ and}$$

$$0.072 \leq (E^*a/HS) \leq 0.140 \quad (3)$$

wherein
   the tan δ in relationship (1) is a tan δ determined by viscoelastic measurement at an initial strain of 10%, a dynamic strain of 1%, and a temperature of 50° C.;
   the E*a in relationships (2) and (3) is a complex modulus E*a in a circumferential direction of the tire determined by viscoelastic measurement at an initial strain of 10%, a dynamic strain of 1%, and a temperature of 50° C.;
   the E*b in relationship (2) is a complex modulus E*b in a direction orthogonal to the circumferential direction of the tire determined by viscoelastic measurement at an initial strain of 10%, a dynamic strain of 1%, and a temperature of 50° C.; and
   the HS in relationship (3) is a hardness (HS) at 50° C. determined in accordance with JIS K6253-1,
   wherein the tire component is a sidewall and/or an innerliner,
   wherein the rubber composition comprises a rubber component and a short fibrous filler, and
   the short fibrous filler has a fiber width of 3 to 200 nm, a fiber length of 0.2 to 10 μm, and a ratio of the fiber length to the fiber width (fiber length/fiber width) of 5 to 1,000.

2. The pneumatic tire according to claim 1, wherein the short fibrous filler is present in an amount of 1.5 to 30 parts by mass per 100 parts by mass of the rubber component.

3. The pneumatic tire according to claim 2, wherein the rubber composition comprises a masterbatch, and the masterbatch is prepared by mixing a rubber latex having a zeta potential of −100 to −20 mV with a short fibrous filler dispersion having a zeta potential of −90 to −10 mV to prepare a latex compound and adjusting the latex compound to have a zeta potential of −30 to 0 mV.

4. The pneumatic tire according to claim 1, wherein the tire component is a sidewall.

5. The pneumatic tire according to claim 4, wherein
   the tire component is a sidewall,
   the sidewall comprises a stack of two or more layers including an outer sidewall layer that forms an outer surface of the tire and an inner sidewall layer disposed axially inwardly of the outer sidewall layer, and
   the inner sidewall layer is formed from the rubber composition.

6. The pneumatic tire according to claim 5, wherein
   the pneumatic tire comprises the sidewall and a carcass coated with a topping rubber disposed axially inwardly of the inner sidewall layer, and
   a distance from an outer surface of the outer sidewall layer to an outer surface of the topping rubber at a position where the tire with a specified internal pressure has the maximum width is less than 3.5 mm.

7. The pneumatic tire according to claim 1, wherein the value of relationship (1) is 0.10 or less.

8. The pneumatic tire according to claim 1, wherein the value of relationship (2) is 1.15 to 1.50.

9. The pneumatic tire according to claim 1, wherein the value of relationship (3) is 0.080 to 0.130.

10. The pneumatic tire according to claim 1, wherein the rubber composition comprises additional filler in an amount of 40 parts by mass or less per 100 parts by mass of a rubber component.

11. The pneumatic tire according to claim 1, wherein the rubber composition comprises carbon black having a nitrogen adsorption specific surface area of 70 to 150 m²/g.

12. The pneumatic tire according to claim 1, wherein the rubber composition comprises vulcanization accelerator in an amount of 1.5 to 5 parts by mass per 100 parts by mass of a rubber component.

13. The pneumatic tire according to claim 1, wherein the rubber composition comprises carbon black in an amount of 38 parts by mass or less per 100 parts by mass of a rubber component.

* * * * *